Patented Apr. 11, 1944

2,346,320

UNITED STATES PATENT OFFICE 2,346,320

CLARIFICATION AND PURIFICATION OF INDUSTRIAL LIQUORS

Walter G. Moran, Woodbridge, and Sandford S. Cole, Metuchen, N. J., assignors to National Lead Company, New York, N. Y., a corporation of New Jersey No Drawing. Application April 24, 1941, Serial No. 390,132

7 Claims. (Cl. 210—42.5)

This invention relates to the clarification and purification of industrial liquors. It has particular reference to solutions containing strong inorganic acids and still more particularly to solutions obtained in the sulfuric acid processes for the manufacture of titanium dioxide pigments from titaniferous ores such as ilmenite.

The reaction product obtained from the sulfuric acid digestion of ground ilmenite contains a certain amount of unattacked ore as well as other insoluble matter mainly consisting of colloidal and near colloidal particles of titanium compounds, siliceous material and silicates. On subsequent lixiviation of the digestion product a considerable portion of the insoluble material remainse in coilloidal suspension and must be coagulated before it can be removed from the solution by settling or filtration.

The problem of removing colloidal unfilterable mineral matter from sulfuric acid-ilmenite solutions and other similar solutions has been the subject of considerable research. As a consequence of these extensive researches a number of different purification processes have been disclosed in the prior art. All these processes deal with the removal of the suspended unfilterable material by coagulation brought about by adding to the solution or causing to be formed therein an agent or a compound having a polarity opposite to that of the suspended material, followed by settling and/or filtration.

One of the most common clarification processes for strongly acid soltuions, such as sulfuric acid-ilmenite solutions, disclosed in the prior art, is the coagulation of the suspended matter by the addition of an organic colloid, such as glue. Another known process which is effective in the clarification of industrial liquors, and which is especially adaptable for the clarification of reduced, crude solutions of ilmenite in sulfuric acid, is the coagulation of the suspended residue with an insoluble metal sulfide, such as for example, antimony sulfide or copper sulfide, which is formed in situ, i. e., in the solution to be clarified. The negatively charged particles of the metal sulfide and the positively charged colloidal suspended matter are mutually neutralized causing a coagulation or flocculation to occur. In this process it is convenient to have the metal in question in the solution to be clarified and to add a solution of a soluble sulfide, preferably alkali sulfide, in amounts sufficient for the precipitation of the insoluble metal sulfide.

It has been observed that the use of organic colloids, such as common glue, as a coagulant for the suspended insoluble colloidal residue in sulfuric acid solutions containing titanium and iron is most effective when applied to solutions of a not too high specific gravity, i. e., the degree of flocculation, the rate of settling and the rate of filtration are such as clarification can be carried out in an effective and economical manner only when operating with solutions of a specific gravity below 1.500, preferably not above 1.475. It is necessary when coagulating with glue to add about one part of dry glue by weight to about 1000 parts of solution.

It has also been observed when the clarification is carried out with the aid of insoluble metal sulfides, for example, antimony sulfide, according to known methods, that it is possible to operate with sulfate solutions of higher concentrations than is possible when using glue as a coagulant. Solutions of specific gravities of from about 1.550 to about 1.570 may be successfully clarified by this method.

The advantage to the industry inherent in the latter clarification method is obvious in that the subsequent crystallization of excess ferrous sulfate and concentration steps may be carried out more effectively and with more economy than is possible when operating with solutions of lower concentrations.

One procedure of the titanium dioxide industry for the separation of the coagulated residue from sulfate solutions is to allow the flocs to settle out in a continuous operation in a settling tank. The more or less clarified "overflow" from the tank is in a subsequent step freed of remaining unsettled coagulated matter by filtration, the "underflow" containing practically all of the coagulated residue being separately processed for the separation of the liquid from the solids before being recirculated in the solution-producing system.

The "overflow" from such a continuous settling system, which as already pointed out still contains a certain amount of unsettled matter, the complete removal of which by gravitational settling would be altogether too time-consuming for an efficient operation, is customarily subjected to a filtration operation, preferably in a filter press by which it is possible rapidly to produce a completely clarified solution, and it is in this filtration step that the efficiency of the whole clarification system to a great extent depends.

When the rate of flow from the filter press because of blinding of the filter medium slows down below a point where production no longer can be maintained, it becomes necessary to shut the press down for renewal of the filter aid which is used in conjunction with the usual filter media. The time which elapses between necessary shut-downs for removal of the filter aid generally in the form of a precoat is designated as a filter-cycle in the industry.

The shut-down of the filter press interrupts production, is labor-consuming and otherwise expensive. It will therefore be recognized that it is desirable from a standpoint of uninterrupted production and economy to maintain the rate of flow of filtered liquor for the longest possible time, i. e., to be able to operate with long filter-cycles.

The "underflow" from the settling tank containing substantially all of the coagulated material, hereafter referred to as "mud," is treated in a separate system where the "mud" is separated from the liquor by settling and filtration after dilution. The recovered liquor may be returned to the process in its entirety whereas for obvious reasons part of the "mud" must be withdrawn from recirculation to avoid accumulation of insoluble compounds in the system.

It will be recognized that it is desirable from an economical point of view to circulate as much as possible of the titanium dioxide containing "mud" to the digestion system for a more complete recovery of the titanium values, and that the more efficient the clarification system operates the more of the "mud" can be circulated therein without enlarging the facilities.

While clarification of sulfuric acid solutions of ilmenite with insoluble metal sulfides, such as antimony sulfide or copper sulfide, enables one to operate with solutions of as high specific gravities as 1.550 to 1.570 (instead of 1.475 when glue is used), thereby increasing the efficiency of such subsequent steps in the process as crystallization and concentration, it has been observed that the filtration rate of the "overflow" from the settling tank was rather slow in spite of its low content of unsettled coagulated matter, and that the precoat-cycles were short, necessitating frequent shut-downs for renewal of the precoat. The gain therefore in production experienced through the handling of a more concentrated solution in the settling tank was offset to some degree by the lowering of the capacity of the filter press used in the final clarification step.

We have now discovered a method by which it is possible to overcome the deficiencies of the metal sulfide clarification process.

Our method consists primarily in a special combination of metal sulfide and glue treatment in which the conjoint action of the metal sulfide and the glue provide unexpected improvements in the clarification of acid industrial liquors, especially sulfuric acid-ilmenite solutions.

Accordingly, the principal object of the present invention is the provision of a method whereby it will be possible to operate more efficiently than heretofore with titanium sulfate solutions of high specific gravity.

Our particular object is to provide a method of clarification whereby the suspended insoluble coagulated material in the "overflow" is rendered more easily filterable, and whereby frequent shut-downs of the filter are avoided.

Other objects are to increase the production of filtered overflow per unit of equipment; by increasing the circulation of "mud" from the "underflow" to improve the recovery of the titanium values; to increase the direct return to the digestion reaction of the metal sulfide formed in the coagulation treatment, thereby increasing the recovery of the metal, e. g., antimony, and to facilitate a more rapid separation of the "mud" from the liquid phase in the "underflow" by improving the filterability thereof.

These and other objects will become apparent as the description of our invention proceeds.

We have discovered that if, in conjunction with the insoluble metal sulfide treatment, we add to the unclarified reduced sulfuric acid-ilmenite solution a small amount of an organic colloid which is coagulated by inorganic acid liquors, such as common glues, gelatins, albuminoids and proteins that the filterability of the "overflow" from the settling system is improved to such a degree that the volume of filtrate from the filter press per precoat cycle is increased to about four times that of a similar "overflow" containing the same amount of suspended coagulated matter but settled with insoluble metal sulfide alone. We have also found that the separation by filtration of the solution from the coagulated residue in the "underflow" from the settling system was improved by our novel treatment.

It was found that the addition of a small amount of glue in conjunction with the metal sulfide treatment did not noticeably affect the rate and efficiency of the gravitational settling of the coagulated residue, and it is in the unexpected improvement of the filterability of the overflow, brought about by the special conjoint action of the insoluble metal sulfide and the glue that the principal novelty of our treatment resides.

Improved washability of the filtered mud from the "underflow" was also observed as a consequence of the process of our invention.

We do not claim to know the real reason for the unexpected improvement in filtering qualities obtained with our novel treatment, but it is reasonable to believe that the improvement lies in the formation of flocs of a size and mechanical structure conducive to the formation and maintenance of a strong and porous filter cake. We may, if desired, avail ourself of the use of filter aid in the filtration of the overflow from solutions treated according to our novel process.

In order that our improved process may be better understood by those skilled in the art we shall now by way of description of actual operations explain the working of our invention and the advantages derived therefrom.

To a mixture of one part by weight of ground ilmenite and one and one-half parts of 99 per cent sulfuric acid in a digestion tank was added 0.1 per cent $Sb_2O_3$ calculated on the total $TiO_2$ in the final batch, and a mixture of a slurry of 30 per cent washed underflow solids in spent hydrolysis liquor representing 75 per cent of the "mud" obtained in the settling of a sulfate solution derived from a similar previous digestion of ilmenite and "mud." The antimony content of the recirculated "mud" represented 75 per cent of the antimony required for the total batch.

A reaction was caused to take place in known manner, the reaction product was allowed to cool and the soluble compounds of titanium and iron were brought into solution by addition of water and weak acid solution circulated from the clarification system; the solution was then reduced with metallic iron and pumped to the continuous clarification system. A temperature of 60° C. was maintained in the solution which had a specific gravity of 1.550 at this temperature. The solution contained 0.6 g. p. l. dissolved $Sb_2O_3$.

For the purpose of clarification of the crude solution a solution of sodium sulfide (8 per cent $Na_2S$) containing glue was added in a continuous stream to the solution as it was being pumped into the continuous clarification system. The amount of glue added was calculated to one part of dry glue to 10,000 parts by weight of solution, which amount of glue is only about one tenth of the amount required when coagulating with glue alone according to prior art. The sodium sulfide was added in about 10 per cent excess of the calculated molar equivalence of the antimony content.

In the ensuing reaction the antimony was precipitated as antimony sulfide which together with the glue acted as a coagulant for the suspended unreacted colloidal "mud."

The coagulated "mud" containing the antimony sulfide settled out while the supernatant liquor, the so-called "overflow," still analyzing 0.01–0.5 (average about 0.1 g. p. l.) g. p. l. residue, was mixed with 3–5 g. p. l. Hyflo (a diatomaceous filter aid) and then pumped to a filter press precoated with a diatomaceous earth, for example, Hyflo. The rate of flow and the amount of filtered "overflow" obtained before blinding of the filter necessitated a renewal of the precoat were measured.

When operating exactly as described above, with the exception that no glue was introduced together with the sodium sulfide at coagulation, and that only 50 per cent of the "mud" was recirculated as compared to 75 per cent above, but maintaining the same amount of dissolved antimony in circulation by addition of a correspondingly greater amount of fresh $Sb_2O_3$ at digestion, it was found that the amount of filtrate obtained before blinding of the filter necessitated a shutdown for renewal of the precoat was only about one-fourth to one-half of that obtained when coagulating with antimony and glue according to our novel method as described above. The rate of flow of filtrate when coagulating with antimony alone was also much slower than with conjoint coagulation with antimony and glue.

The "underflow" from the antimony sulfide-glue treatment containing practically all of the settled "mud" and the antimony in the form of sulfide was processed for return to the digestion reaction, after dilution with spent acid from the hydrolysis department, one part by volume of "underflow" to two parts of diluted spent acid, the "mud" was settled and then deliquored on a continuous filter. The solution obtained from the settling and filtration of the "mud" was returned to the process in its entirety, whereas, as already described, 75 per cent of the washed "mud" was recirculated to the digestion for the recovery of the antimony and digestible titanium values. The 25 per cent of the antimony removed from circulation by bleeding the washed "mud" slurry was restored by addition of a corresponding amount of fresh $Sb_2O_3$ to the digestion reaction.

Furthermore, it will be seen that the maximum amount of "mud" which could be recirculated in the digestion solution system at the same specific gravity of the solution, i. e., 1.550 at 60° C. without slowing up the settling was about 50 per cent, when antimony alone was used for coagulation as compared to 75 per cent when operating according to our novel method. The lower "mud" circulation constituted a corresponding loss of antimony and recoverable titanium in the "mud."

In the foregoing description of the treatment of the present invention the coagulation of the residue was brought about by the addition of a calculated amount of a sodium sulfide solution containing the required small amount of glue. This procedure we have found to be very effective and convenient. It is, however, not necessary for a successful operation with our novel treatment to introduce the sulfide and the small amount of glue as one solution. We have found that the glue may be added separately at any time prior to the filtration operation but not substantially before the sulfide is introduced.

The following table sums up the results obtainable with clarification with glue alone, with antimony sulfide alone according to prior practice, and with antimony sulfide and glue conjointly according to our invention:

|  | Used for coagulation | Sp. gr. at 60° C. | Weight ratio Dry glue:soln. | Cu. ft. filtrate obtained [1] | Production of $TiO_2$ in soln.[1] |
|---|---|---|---|---|---|
| Prior art | (A) Glue alone | 1.475 | 1: 1,000 | 6,500 | 85% of A. |
|  | (B) $Sb_2O_3$ alone | 1.550–1.570 |  | 4,000 |  |
| Method of invention | (C) $Sb_2O_3$+glue | 1.550–1.570 | 1 : 10,000 | 8,000–16,000 | 170 to 400% of A. |

[1] Before blinding of the filter slowed down the rate below an economical point.

The excellent result obtained when coagulating with antimony and glue according to our invention is wholly unexpected in view of the fact that the solid content of the "overflow" from the continuous settling system remained the same, 0.01–0.5 g. p. l. (average about 0.1 g. p. l.) the same as when antimony, according to prior practice, was used alone.

It will be seen that the efficiency of the clarification system because of the treatment of our invention, not only was improved in respect to increased production of concentrated clarified filtered "overflow" solution through increased filtration rate through the filter press and prolonged life of the filter press pre-coat, necessitating less frequent shutdown for renewal of the pre-coat, but that as a direct consequence of our treatment it became possible to operate with a greater amount of recirculated "mud." This is, of course, an added advantage of our invention.

While we in the foregoing description of actual operations have confined ourselves to the clarification of sulfuric acid solutions of ilmenite it should be understood that our novel clarification method is equally as useful in the clarification of sulfuric acid solutions derived from other titaniferous ores and compounds. Our method may also be used in the clarification of solutions containing the titanium in the form of, for example, chloride or fluoride. Our method is also adaptable for the clarification of solutions derived from the other ores and compounds than those containing titanium.

While we in the description of our novel process have given an amount of glue equal to about one part by weight of dry glue to 10,000 parts of solution, it should be understood that we do not wish to limit ourselves to such an amount. The amount of glue used in our invention, although always very small, will vary to some extent all according to the condition and type of solution under clarification.

It should also be understood that the amount of sulfide forming metal and the amount of excess soluble sulfide, e. g., sodium sulfide, used in our novel clarification treatment may be subject to variations without thereby deviating from the scope of the invention.

Having now described and explained in detail the working of our invention, what we claim is:

1. Process for the clarification of industrial acid liquors containing suspended matter which comprises forming, in situ, in such liquor an insoluble colloidal metal sulfide by reaction between a salt of a metal soluble in such liquor, the sulfide of which is insoluble therein and at least a sufficient amount of an inorganic sulfide also soluble in such liquor to precipitate the metal of said salt as insoluble colloidal metal sulfide, adding thereto at least about 1 part by weight of a coagulating organic colloid for every 10,000 parts by weight of liquor, and separating the settled residue containing the suspended matter, coagulated colloid and insoluble metal sulfide from the clarified supernatant liquor.

2. Process for the clarification of ilmenite liquors which comprises forming, in situ, in such liquor an insoluble colloidal metal sulfide by reaction between a salt of a metal soluble in such liquor, the sulfide of which is insoluble therein and at least a sufficient amount of an inorganic sulfide also soluble in such liquor to precipitate the metal of said salt as insoluble colloidal metal sulfide, adding thereto at least about 1 part by weight of a coagulating organic colloid for every 10,000 parts by weight of liquor, and separating the settled residue containing the suspended matter, coagulated colloid and insoluble metal sulfate from the clarified supernatant liquor.

3. Process of claim 2 wherein the metal compound forming the insoluble sulfide is a compound of antimony soluble in ilmenite liquors.

4. Process of claim 2 wherein the soluble sulfide compound is an alkali metal sulfide.

5. Process according to claim 2 wherein the coagulating organic colloid is glue.

6. Process for the clarification of ilmenite liquors containing suspended matter which comprises adding to an ilmenite liquor containing in solution a compound of antimony at least about 1 part by weight of glue for every 10,000 parts of liquor, and simultaneously adding sodium sulfide to form, in situ, insoluble colloidal antimony sulfide and separating the settled residue containing suspended matter, coagulated glue and insoluble antimony sulfide from the clarified ilmenite liquor.

7. Process for the clarification of industrial acid liquors containing suspended matter which comprises forming, in situ, in such liquor an insoluble colloidal metal sulfide by reaction between a salt of a metal soluble in such liquor, the sulfide of which is insoluble therein, and at least a sufficient amount of an inorganic sulfide also soluble in such liquor to precipitate the metal of said salt as insoluble colloidal metal sulfide, adding thereto at least about 1 part by weight of a coagulating organic colloid selected from the group consisting of glues, gelatins, albuminoids and proteins for every 10,000 parts by weight of liquor, and separating the settled residue containing the suspended matter, coagulated colloid and insoluble metal sulfide from the clarified supernatant liquor.

WALTER G. MORAN.
SANDFORD S. COLE.